(12) United States Patent
Peterson et al.

(10) Patent No.: US 9,280,654 B1
(45) Date of Patent: Mar. 8, 2016

(54) BATTERY AUTHENTICATION CIRCUIT

(71) Applicant: Electrochem Solutions, Inc., Clarence, NY (US)

(72) Inventors: Brian R. Peterson, Norton, MA (US); Kenneth E. Burnap, Taunton, MA (US); Steven W. Winn, Lancaster, NY (US); Michael F. Scalise, Clarence, NY (US)

(73) Assignee: Electrochem Solutions, Inc., Clarence, NY (US)

( * ) Notice: Subject to any disclaimer, the term of this patent is extended or adjusted under 35 U.S.C. 154(b) by 0 days.

(21) Appl. No.: 13/970,087

(22) Filed: Aug. 19, 2013

Related U.S. Application Data

(60) Provisional application No. 61/684,195, filed on Aug. 17, 2012.

(51) Int. Cl.
*G06F 21/44* (2013.01)
*G06F 21/72* (2013.01)
*H02J 9/00* (2006.01)
*G06F 21/81* (2013.01)

(52) U.S. Cl.
CPC .............. *G06F 21/44* (2013.01); *G06F 21/72* (2013.01); *H02J 9/002* (2013.01); *G06F 21/81* (2013.01)

(58) Field of Classification Search
None
See application file for complete search history.

(56) References Cited

U.S. PATENT DOCUMENTS

| 6,005,367 | A | 12/1999 | Rohde et al. |
| 6,766,177 | B2 | 7/2004 | Chambon et al. |
| 6,913,087 | B1 | 7/2005 | Brotto et al. |
| 6,931,266 | B2 | 8/2005 | Miyoshi et al. |
| 7,425,813 | B2 | 9/2008 | Tashiro et al. |
| 7,439,705 | B2 | 10/2008 | Koike et al. |
| 7,449,863 | B2 | 11/2008 | Tashiro et al. |
| 7,482,780 | B2 | 1/2009 | Koike et al. |
| 7,498,766 | B2 | 3/2009 | Paul et al. |
| 8,014,831 | B2 | 9/2011 | Brown et al. |
| 2001/0044331 | A1 | 11/2001 | Miyoshi et al. |
| 2002/0142194 | A1 | 10/2002 | Hong et al. |
| 2003/0181226 | A1 | 9/2003 | Kawata et al. |
| 2005/0001585 | A1 | 1/2005 | Tashiro et al. |
| 2005/0001589 | A1* | 1/2005 | Edington et al. ............... 320/128 |
| 2005/0253553 | A1* | 11/2005 | Phillips et al. ................. 320/112 |
| 2006/0178170 | A1 | 8/2006 | Chung et al. |
| 2007/0139048 | A1 | 6/2007 | Koike et al. |
| 2008/0159534 | A1 | 7/2008 | Rager et al. |

(Continued)

*Primary Examiner* — Harunur Rashid
*Assistant Examiner* — Andrew Steinle
(74) *Attorney, Agent, or Firm* — Steven W. Winn; Michael F. Scalise

(57) ABSTRACT

Various embodiments of modular battery authentication circuits are described. The various modular battery authentication circuits are intended to be utilized with electrically powered devices that do not comprise existing battery authentication capabilities. In one embodiment, a modular battery authentication adapter is described. The adapter comprises a housing in which a modular battery authentication circuit resides. One end of the adapter is positioned within a power input port of a device and a modular battery is positioned within the opposing end of the adapter. The authentication circuit within the adapter communicates with the modular battery to determine its authenticity before allowing the battery to power the device. A modular battery comprising an internal authentication circuit is also described. The modular battery is designed to interact with firmware stored within the device to determine whether the modular battery meets certain operational criteria.

39 Claims, 13 Drawing Sheets

(56) References Cited

U.S. PATENT DOCUMENTS

| | | |
|---|---|---|
| 2009/0184689 A1 | 7/2009 | Kressner et al. |
| 2009/0295326 A1* | 12/2009 | Daynes et al. .............. 320/106 |
| 2010/0198286 A1* | 8/2010 | Neumiller et al. ............. 607/5 |
| 2011/0093714 A1 | 4/2011 | Schaecher et al. |

* cited by examiner

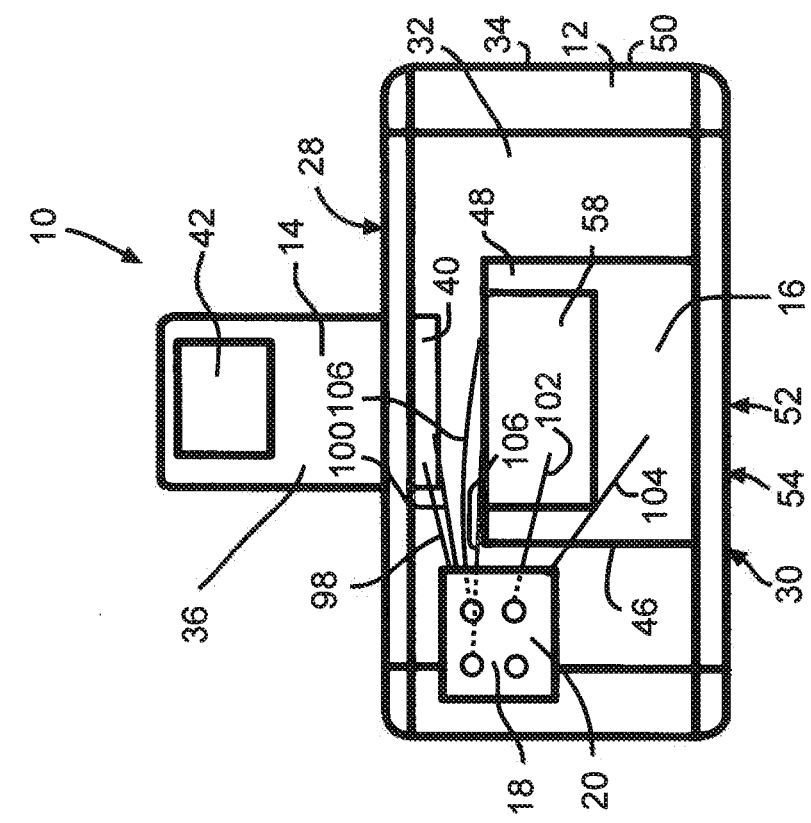
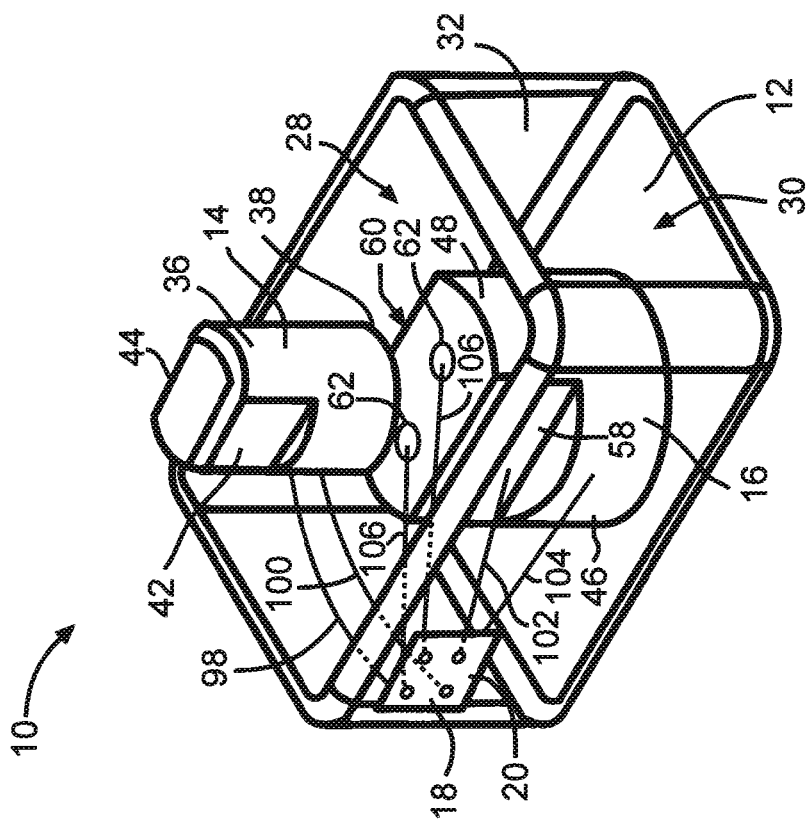

BATTERY AUTHENTICATION CIRCUIT

CROSS-REFERENCE TO RELATED APPLICATION

This application claims priority from U.S. Provisional Application Ser. No. 61/684,195, filed Aug. 17, 2012.

TECHNICAL FIELD

The present invention relates generally to information handling systems, and more particularly to techniques for authenticating electrochemical cells and modular batteries commonly used to provide power to portable electronic devices.

BACKGROUND OF THE INVENTION

In general, electronic device technology is becoming increasingly sophisticated. New features and capabilities are being added to devices every day that enhance the performance of the devices. As a result of the incorporation of these new features and capabilities, the associated electrical power requirements are also advancing and becoming more and more sophisticated and rigorous. In order to meet the electrical power demands of these new devices, the technology and sophistication of the power sources that enable operation of these devices is also increasing.

Among these increasingly sophisticated devices are portable electronic medical devices. Portable medical devices such as external defibrillators, bone saws and drills must meet exacting performance criteria, particularly since these devices are used in medical procedures. In addition, because of federal regulatory requirements and conditions, these devices must generally meet a higher standard of reliable performance over long periods of time. The power sources that energize these portable medical devices are critical to their operation and, therefore, must also meet exacting criteria not only in electrical performance, but also in their construction.

Electrochemical cells that power such portable electronic devices are typically engineered to exacting specifications that provide proper amounts of power and ensure correct and safe device operation. In addition, these cells undergo extensive testing and validation procedures before they are approved and qualified to be included in a device. In many cases, electrochemical cells and modular batteries are designed to work with a specific make and model device. Therefore, it is important that these electrical power sources be manufactured to correct specifications and quality standards to ensure proper device operation.

However, the lucrative and growing electrochemical cell and battery markets have attracted an increasing number of vendors to (re)manufacture and sell counterfeit or sub-standard electrical power sources to unsuspecting customers. In many cases, these counterfeit power sources are made to look like genuine electrochemical cells and batteries. However, these counterfeit electrochemical cells are often not made to the exacting specifications and standards of genuine electrochemical cells. As a result, devices that are powered by such counterfeit electrical power sources may not operate correctly. In fact, a device that is being powered by a counterfeit cell or modular battery may overheat, malfunction, or even cease operation. Counterfeit batteries may not provide adequate safeguards to protect the occurrence of unsafe conditions such as overheating of the cell during the charging and discharge processes. In some instances, over heating of the cell may cause an explosion. Furthermore, additional problems may occur during the recharging of these substandard cells. In addition, these cells may not adequately perform to specification after charging or the cells may even fail during the charging process.

As a result of the emergence of counterfeit electrochemical cells, device manufacturers have developed portable devices with authentication technologies to ensure the correct match between a genuine cell and the device intended to be powered. Among these authentication technologies is the "Secure Hash Algorithm" or SHA-1. Devices that utilize the "Secure Hash Algorithm" technology are generally equipped with internal circuitry that enables the device to communicate with the modular battery that is intended to power the device.

Electronic devices equipped with this type of authentication, generally issue a challenge question such as an encrypted identification code. Once the identification code has been received by the modular battery, the modular battery then issues a reply response such as an encrypted code. If the reply issued by the modular battery matches that which is programmed into the device, the electrochemical cell or modular battery is considered to be genuine and the power source will continue to operate and power the host device as designed. However, if no reply or an incorrect reply is given by the modular battery, the power source is considered to be counterfeit or incorrect. The device, therefore, will not allow itself to be powered by the power source it has identified as being improper.

However, there are many existing devices that were not originally equipped with such power source authentication capabilities. Nevertheless, there is still a need to ensure proper power source use with these devices. Retro-fitting a prior device with authentication technology would require the incorporation of additional circuitry elements into the device. This option may not be possible due to electronic circuit or space constraints within the device. Furthermore, retro-fitting a power source authentication circuit within an existing device would also not be cost effective.

Therefore, there exists a need to provide existing devices with a means to authenticate the power source that is powering it. The present invention, therefore, provides various embodiments in which existing electronic devices, which are not equipped with authentication technology, such as SHA-1, with a means to verify or authenticate the electrochemical cell or modular battery intended to power the device.

SUMMARY OF THE INVENTION

The present invention provides various embodiments by which the authenticity of an electrochemical cell or plurality of cells, i.e., a modular battery, can be verified. More specifically, the present invention provides various embodiments in which the authenticity of an electrochemical cell or plurality of cells, for use with a device that is not equipped with battery authentication capabilities, can be verified.

In one embodiment, a power source authentication adapter is provided which facilitates authentication of an electrochemical cell or modular battery. In this embodiment, the adapter comprises a separate authentication circuit that resides within the housing of the adapter. In a preferred embodiment, one end of the adapter is received within the power input port of a device and the cell or modular battery is received within the opposing end of the adapter. Once the power source is received within the adapter, the authentication circuit, housed within the adapter, communicates with the cell or modular battery circuitry to confirm and verify its authenticity.

In an embodiment, the adapter comprises authentication circuitry that interrogates the power source, therefore ensuring the modular battery is genuine. The authentication circuit within the adapter initiates an electrical signal that is directed to the power source. If an incorrect response is given by the power source, or, if no response is detected by the adapter, the battery is considered to be incorrect and the adapter will not allow the device to be powered. The adapter serves as a gateway between the device and the electrochemical cell and/or modular battery intended to power it.

In another embodiment, a modular battery comprising battery authentication capability therewithin is provided. In this embodiment, the modular battery preferably comprises an authentication circuit having a separate communication terminal that is used to communicate with its host device. Once positioned within the device intended to be powered, the power source authentication circuitry, residing within the electrochemical cell or modular battery communicates with the host device. Specifically, the authentication circuitry within the modular battery communicates with its host device such that it interrogates the device's operating code, i.e., firmware.

The authentication circuitry within the modular battery is capable of reading and modifying the existing firmware of the host device. In an embodiment, the authentication circuit within the modular battery modifies the existing firmware of the host device such that the device requires a specific signal from the installed power source before operating. Once the modified software is installed, the battery programming pin is used to communicate with the device's updated firmware to verify the authenticity of the power source. If the firmware of the host device does not issue a response or if an incorrect response is received, the cell or modular battery is considered to be incorrect and therefore, the device will not operate. Alternatively, if the host device does not receive a response from the modular battery or if an incorrect response is received from the modular battery, the cell or modular battery is considered to be incorrect and therefore, the device will not operate.

BRIEF DESCRIPTION OF THE DRAWINGS

FIG. 1 is a perspective view of an embodiment of an electrical power source authentication adapter of the present invention.

FIG. 2 illustrates a side view of the embodiment of the power source authentication adapter shown in FIG. 1.

DETAILED DESCRIPTION OF THE PREFERRED EMBODIMENTS

Figure 4:
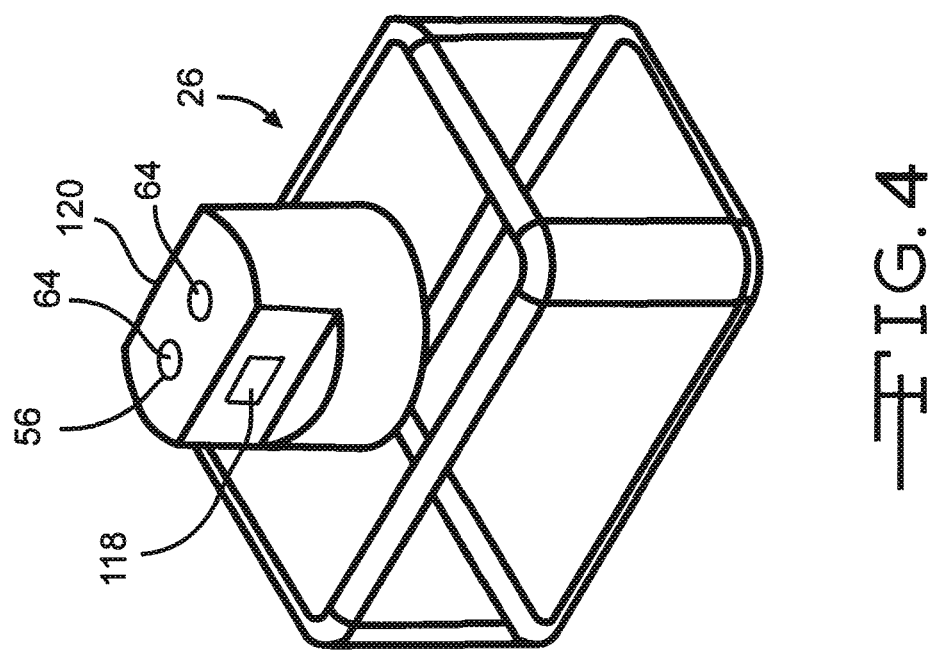
FIG. 4 is a perspective view of an embodiment of a modular battery of the present invention.
Figure 3:
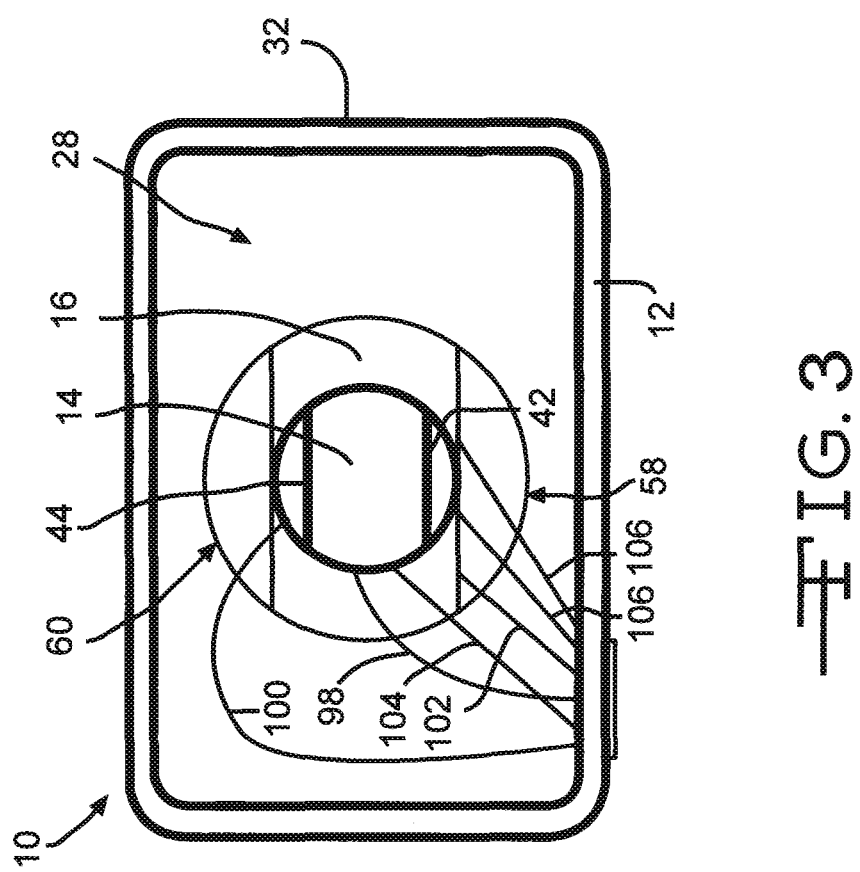
FIG. 3 illustrates a top view of the embodiment of the power source authentication adapter shown in FIG. 1.
Figure 5:
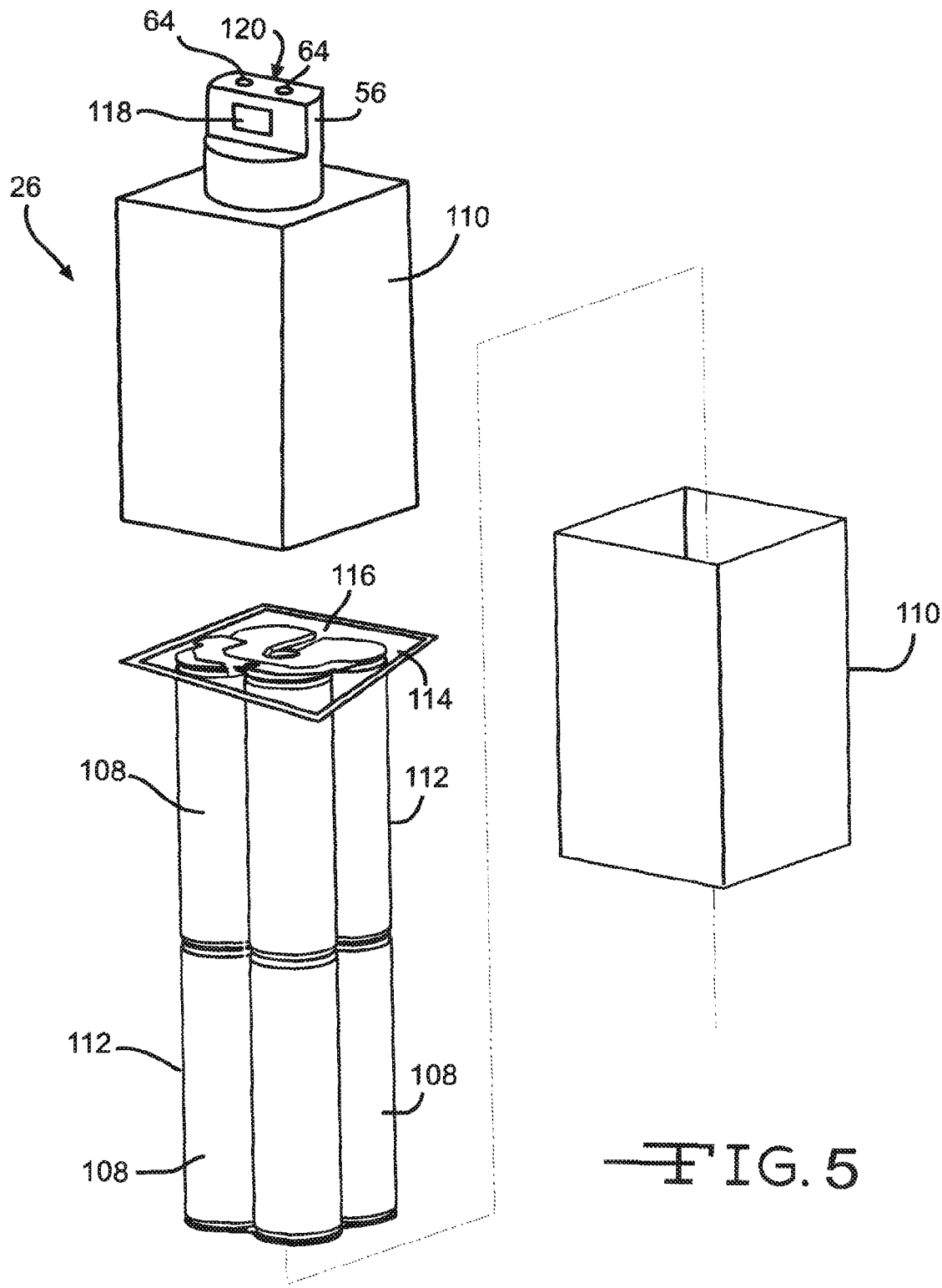
FIG. 5 shows an exploded view of the embodiment of the modular battery shown in FIG. 4.
Figure 6:
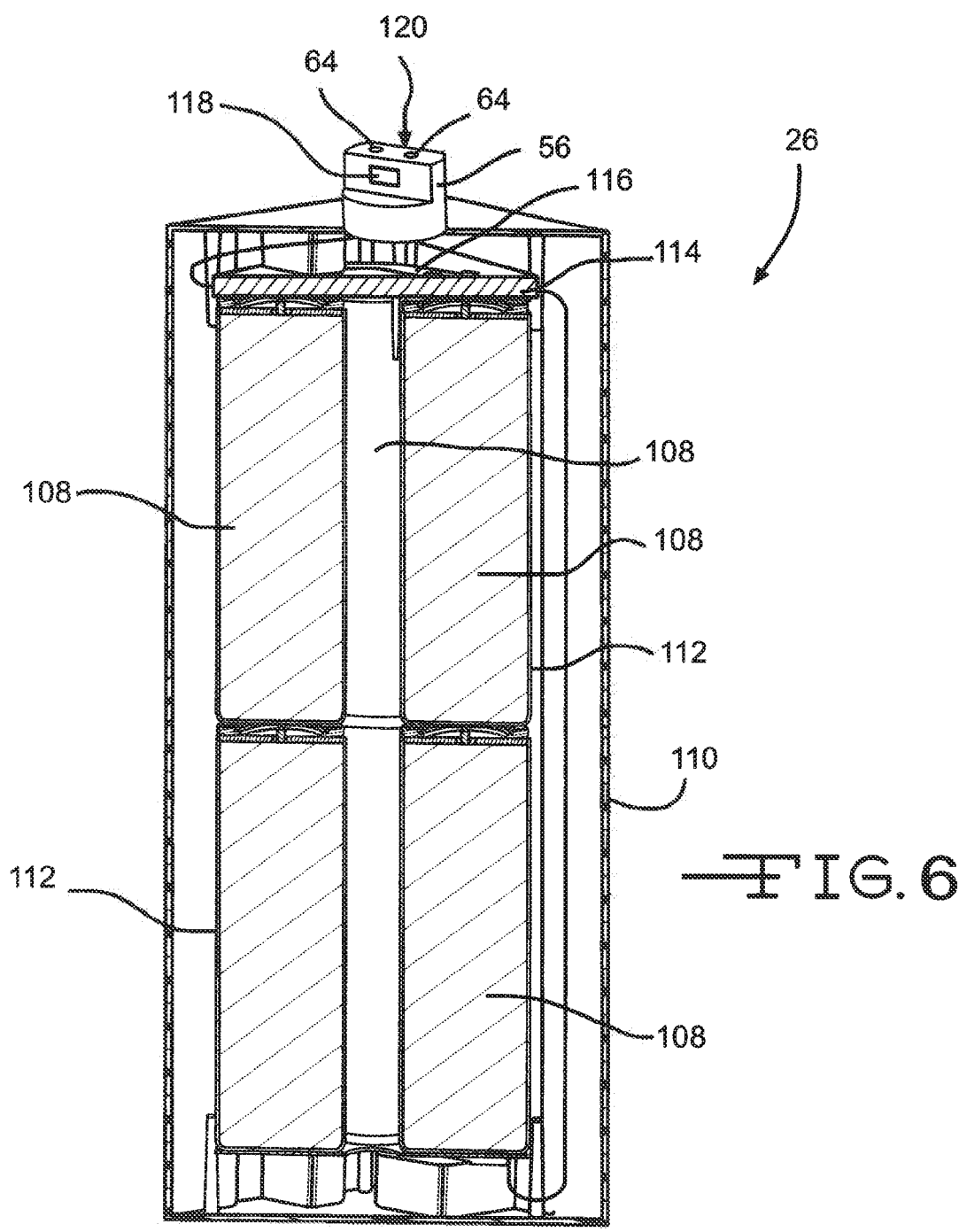
FIG. 6 is a cross-sectional view of the embodiment of the modular battery shown in FIG. 4.
Figure 7:
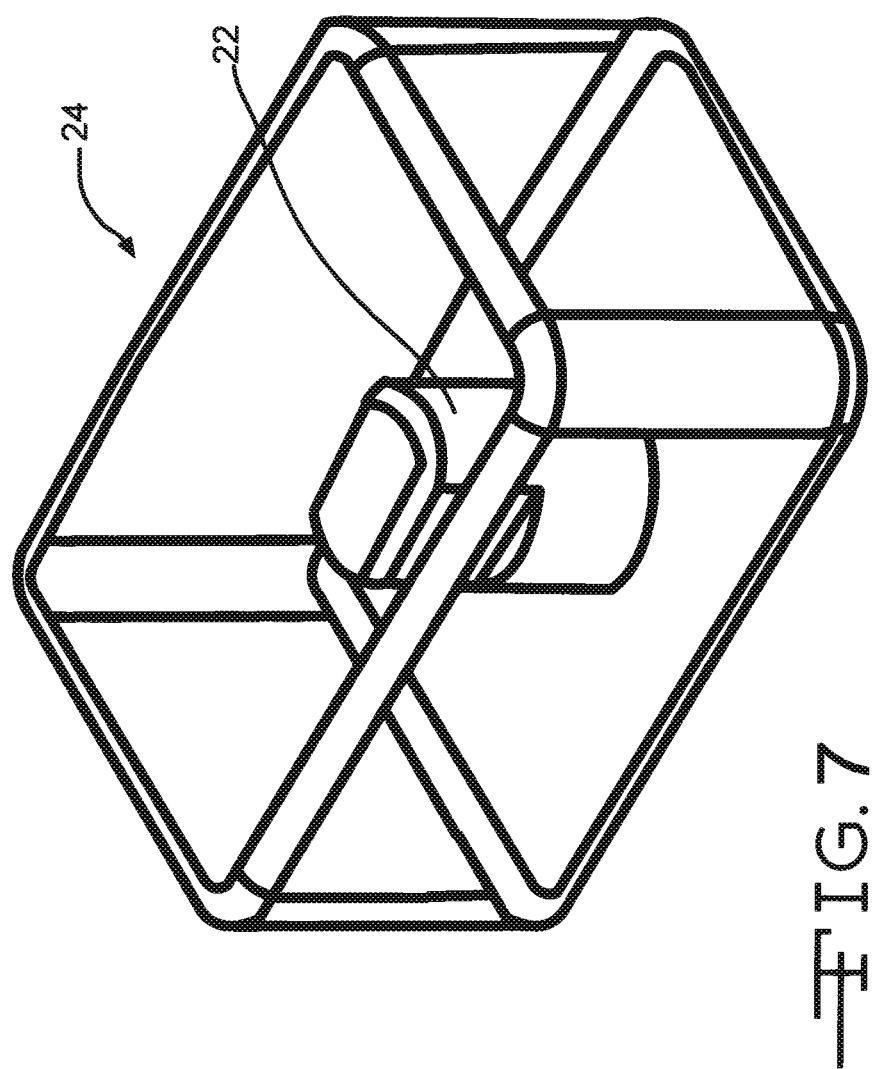
FIG. 7 illustrates an embodiment of a device that is capable of receiving the power source authentication adapter shown in FIG. 1.

Turning now to the drawings, FIGS. 1-3 illustrate various embodiments of a power source authentication adapter 10, according to the present invention. As shown, the adapter 10 comprises an adapter housing 12, a device connector 14, an adapter power source receiving port 16 and an authentication circuit 18 that is supported on an authentication circuit board 20 that resides within the housing 12. The device connector 14 is designed to be received within a power input port 22 of an electrically powered device 24 (FIG. 7). The adapter power source receiving port 16 is designed to receive a modular battery 26 (FIGS. 4-6). It is noted that the power source authentication adapter 10 of the present invention is designed to be utilized with a variety of non-limiting devices 24, particularly those devices that do not comprise integrated power source authentication capabilities. Exemplary devices 24 may include portable medical devices, such as external defibrillators, medical drills and saws. In addition, the adapter 10 may be used with non medical devices like communication devices, such as radios, and analytical equipment such as sensors.

The authentication circuit board 20 is electrically connected to both the adapter power source receiving port 16 and the adapter device connector 14. When the adapter 10 is properly installed within a device 24 and a modular battery 26 is inserted within the adapter power source receiving port 16, the authentication circuit 18 communicates with the modular battery 26 to verify the authenticity of the modular battery 26 that is installed within the device 24. Once verified, the authentication circuit 18 allows the flow of electrical voltage or current from the modular battery 26 to the device 24. If the authentication circuit 18 cannot authenticate the installed modular battery 26, the circuit 18 prevents the transfer of voltage or current from the battery 26 to the device 24, thereby preventing operation of the device 24. In addition to verifying the authenticity of a modular battery 26, the authentication circuit 18 may also be capable of determining, monitoring and/or analyzing the electrical voltage, electrical current and temperature within the installed modular battery 26.

As shown in FIGS. 1-3, the housing 12 of the adapter 10 comprises opposed top 28 and bottom 30 surfaces. An adapter housing sidewall 32 forms the perimeter of the body of the adapter housing 12 and preferably encloses the power source receiving port 16 and the authentication circuit 18 therewithin.

As shown in FIGS. 1-3, the device connector 14 resides at a top portion 34 of the adapter 10. In a preferred embodiment, a distal end portion 36 of the adapter device connector 14 extends through an opening 38 of the top surface 28 of the housing 12. An opposing proximal end 40 of the device connector 14 resides within the adapter housing 12. The distal end 36 of the adapter device connector 14 is preferably configured to mate with the corresponding power input port 22 of a device 24 (FIG. 7).

In a preferred embodiment, the distal end 36 of the adapter device connector 14 comprises a power terminal 42 that is opposed from a ground terminal 44. When the distal end 36 of the adapter device connector 14 is positioned within the device power input port 22, the respective power and ground terminals 42, 44 of the distal end 36 of the adapter device connector 14 are in electrical contact with respective power and ground terminals within the power input port 22 of the device 24. The proximal end 40 of the adapter device connector 14, which resides within the adapter housing 12, is electrically connected to the authentication circuit board 20. As shown in FIGS. 1-3, the adapter device connector 14 is in the form of a cylinder having respective planar surface power 42 and ground 44 terminals. These terminals reside within recesses of the post and extend in a perpendicular relationship to the top surface 28 of the adapter housing 12. This configuration of the adapter device connector 14 preferably provides a keyed relationship between the adapter 10 and its host device 24. However, it is noted that the configuration of the adapter device connector is non-limiting and may comprise a plurality of different shapes such that the adapter device connector 14 is electrically mateable with its host device 24.

The power source receiving port 16, having opposed proximal 46 and distal 48 port ends, preferably resides at a bottom portion 50 of the adapter housing 12. The power source receiving port 16 is preferably configured to receive a modular battery 26. More specifically, as illustrated in FIGS. 1-3, the power source receiving port 16 preferably resides within the bottom portion 50 of the adapter housing 12. The power source receiving port 16 comprises a body having a receiving inlet 52 that extends within the body of the power source receiving port 16. The power source receiving port 16 is positioned such that an opening 54 of the receiving inlet 52 extends through the bottom surface 30 of the housing 12 of the adapter 10.

In a preferred embodiment, the receiving inlet 52 of the power source receiving port 16 is configured to receive a modular battery connector post 56 (FIG. 4-6). The modular battery connector post 56 is positionable within the power source receiving port 16 such that electrical contact between the modular battery 26 and the adapter 10 is made therewithin. Similar to the adapter device connector 14, the power source receiving port 16 comprises opposed power 58 and ground 60 electrical terminals. As shown in FIGS. 1-3, these terminals 58, 60 reside on an exterior surface of the body of the power source receiving port 16. As shown the body of the power source receiving port 16 is in the form of a cylinder having planar surface power 58 and ground 60 terminals that reside within respective recesses at the port's distal end. Similar to the adapter device connector 14, this configuration preferably provides a keyed relationship between the adapter 10 and the modular battery 26. However, it is noted that the configuration of the power source receiving port 16 is non-limiting and may comprise a plurality of different shapes such that the modular battery 26 is electrically mateable with the adapter 10.

In addition, the power source receiving port 16 comprises at least one battery communication terminal 62. As shown, the power source receiving port 16 comprises two battery communication terminals 62. These battery communication terminals 62 are preferably electrically connected to corresponding communication pins 64 that reside within the modular battery 26 when the modular battery 26 is positioned within the power source receiving port 16 of the adapter 10.

Figure 8:
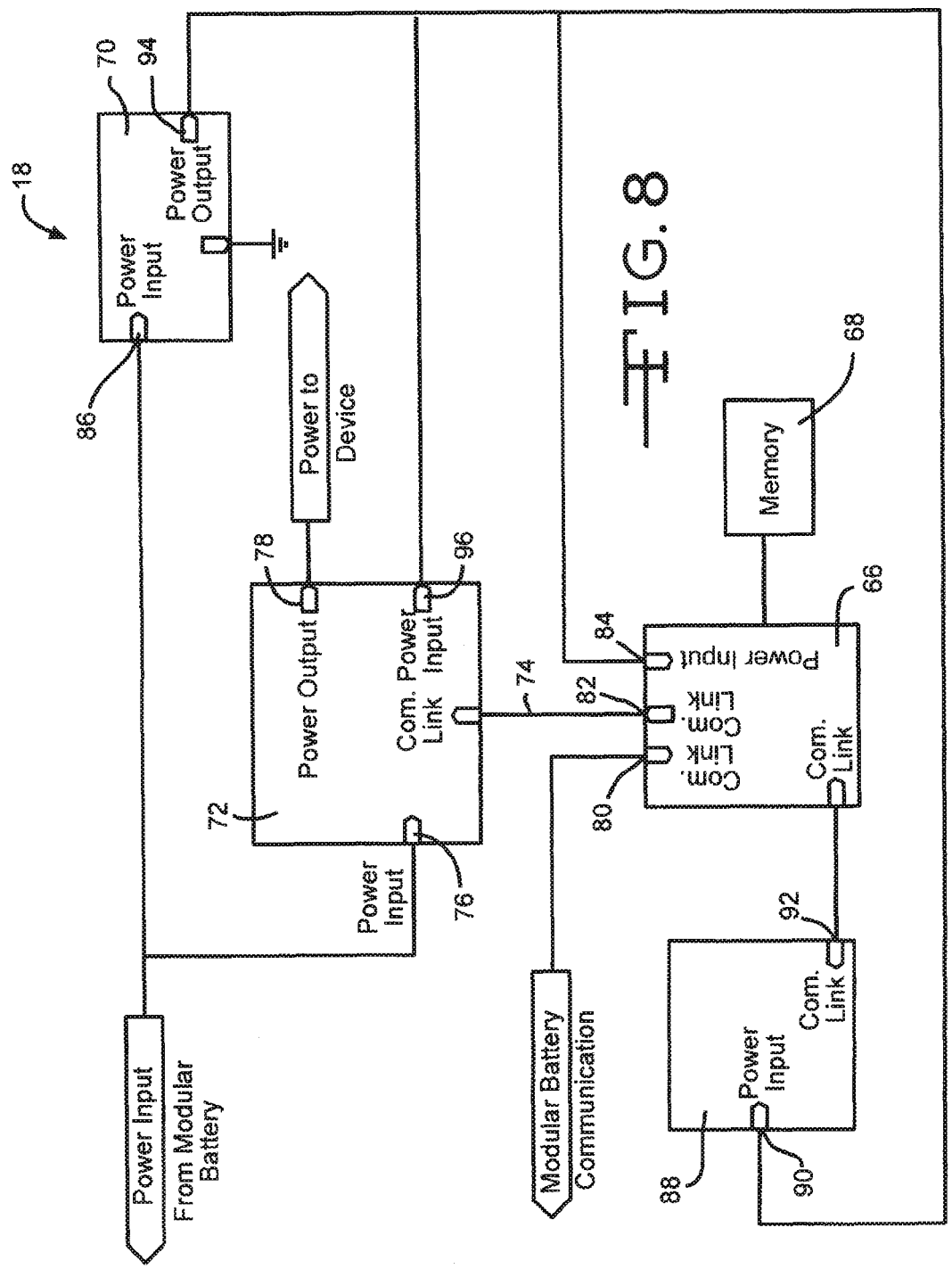
FIG. 8 is an electrical schematic of an embodiment of a power source authentication circuit.

As shown in FIG. 8, an embodiment of the battery authentication circuit 18 is shown. In a preferred embodiment, the battery authentication circuit 18 comprises a micro controller unit 66, digital memory 68, a power supply converter 70, and a switch 72. As shown in FIG. 8, the authentication circuit 18 preferably resides on a substrate forming a battery authentication circuit board 20 (FIGS. 1-3). The substrate may be composed of a non-conductive material such as a polymer or ceramic material. Furthermore, in a preferred embodiment, the authentication circuit 18 may be printed on the surface of the substrate such as a printed circuit board (PCB). Additional electronic components (not shown) such as a capacitor, an inductor and/or a resistor may be positioned on the circuit board 20 and electrically connected to the battery authentication circuit 18.

In a preferred embodiment, the digital memory 68 preferably comprises non-volatile memory such as read-only memory, flash memory, programmable read-only memory (PROM), erasable programmable read-only memory (EPROM) and electrically erasable programmable read-only memory (EEPROM). Non-volatile memory is herein defined as computer memory that retains stored information when not electrically powered. However, other types of volatile computer memory such as random access memory may be incorporated with the authentication circuit 18. The memory 68 is used to store data and other information such as programming code that is used to instruct and operate the micro-control unit 66.

In a preferred embodiment, the switch 72 preferably comprises an electronic control switch such as a transistor or relay switch. Alternatively, the switch 72 may comprise a micro electro-mechanical system (MEMS) switch. A MEMS device is a computer chip in which a circuit controls the operation and movement of a mechanical device such as a sensor, valve, gear, mirror, or actuator that is embedded within the computer chip. The switch 72 preferably controls the flow of electrical voltage or electrical current that powers the device 24. As shown in the diagram of FIG. 8, the switch 72 is electrically connected to the micro-control unit (MCU) 66 through a communication link 74. The MCU 66 communicates with the switch 72 to control the flow of voltage or current from the modular battery 26 to the device 24. When the switch 72 is in an "on" position, voltage or current is allowed to flow from the modular battery 26 to the device 24. When the switch is in an "off" position, voltage or current is not allowed to flow from the modular battery 26 to the device 24.

As shown in FIG. 8, the switch 72 controls the flow of electrical power received from the modular battery 26 positioned within the device 24. As illustrated in the schematic, power from the modular battery 26 is received at a power input point 76 of the switch 72. When the switch 72 is in the "on" position, power flows through the switch 72 to a power output port 78 where the power then travels through the device 24 to thereby electrically power it. As defined herein "electrical power" may either be an electrical voltage or electrical current.

In a preferred embodiment, the micro-controller unit (MCU) 66 comprises a digital computer processor. As shown in the schematic of FIG. 8, the MCU 66 may further comprise a power source communication port 80, a switch communication port 82 and a power input port 84. The modular battery 26 is preferably connected to the power source communication port 80. The switch 72 is electrically connected to the switch communication port 82. If desired, a second micro-control unit 88 may be incorporated in the authentication circuit 18 as shown in the electrical schematic of FIG. 8.

The power supply converter 70 modulates electrical power from the modular battery 26 to the components of the authentication circuit 18. In a preferred embodiment, voltage or current from the battery 26 is received in a power input port 86 of the power supply converter 70. The voltage or current is then modulated and then distributed to the components of the authentication circuit 18, the switch 72, through its power input port 96, the MCU 66, through its power input port 84, and the secondary MCU 88, if desired, through its power input port 90.

In a preferred embodiment, the circuit board 20 is electrically connected to both the power source receiving port 16 and the device connector 14. These connections allow for the authentication circuit 18 to control the flow of electrical voltage or electrical current from the battery 26 to the host device 24. As will be discussed later, the authentication circuit 18 preferably communicates with the battery 26 to verify its authentication.

As shown in FIGS. 1-3, a first wire 98 electrically connects the power terminal 42 of the adapter device connector 14 to the authentication circuit board 20. A second wire 100 electrically connects the ground terminal 44 of the device connector 14 to the authentication circuit board 20. A third wire 102 electrically connects the power terminal 58 of the power source receiving port 16 to the authentication circuit board 20. A fourth wire 104 electrically connects the ground terminal 60 of the power source receiving port 16 to the authentication circuit board 20. A fifth wire 106 electrically connects the authentication circuit board 20 to the communication terminal 62 of the power source receiving port 16. The fifth wire 106 preferably provides a communication channel between the authentication circuit board 20 and the battery 26. Thus, electrical energy such as either a voltage or current is capable of travelling from the modular battery 26 through the authentication circuit board 20 and to the host device 24 that is being powered by the battery 26.

FIGS. 5 and 6 illustrate an embodiment of a modular battery 26 that may be utilized by the adapter 10. As shown, the modular battery 26 comprises at least one electrochemical cell 108 that resides within a modular battery housing 110. As shown in FIGS. 5 and 6, the exemplar modular battery 26 comprises a total of six electrochemical cells 108. Each of these cells 108 comprise a cell casing 112 that encloses an anode and cathode therewithin. In a preferred embodiment, the electrochemical chemistries of the cells 108 are non-limiting and may comprise a primary or secondary cell chemistry. Examples of such electrochemical cells include but are not limited to Lithium Ion (LiON), Nickel Cadmium (NiCd), Nickel Metal Hydride (NiMH), Lithium Oxyhalide, Thionyl Chloride, Bromine Chloride, and Chlorinated Sulfuric Chloride.

Furthermore, it is noted that the modular battery 26 is not limited and may comprise types of batteries that can be used in medical devices, satellites, the oil and gas industry to perform in extreme heat and pressure, survive pounding shock and vibration forces and often withstand corrosive environments; telematic services, military and aerospace applications such as flight data recorders, field communications devices, munitions, sensing devices, intelligence and surveillance, GPS systems, and un-manned aerial vehicles; seismic surveying; oceanography; and other industrial uses.

As shown in FIGS. 5 and 6, the modular battery 26 may comprise a modular battery circuit board 114 that resides within the modular battery housing 110. In an embodiment, the circuit board 114 of the modular battery 26 may comprise a modular battery communication circuit 116, supported by the modular battery circuit board 114, that enables communication with the authentication circuit 18 within the adapter 10. In a preferred embodiment, when the modular battery 26 is positioned within the power source receiving port 16, power 118 and ground 120 terminals of the modular battery 26 electrically contact corresponding power and ground modular battery receiving port terminals 58, 60. In addition, the communication pin 64 of the modular battery 26 contacts the communication terminal 62 within the power source receiving port 16 such that the authentication circuit 18 within the adapter 10 is capable of communicating with the communication circuit 116 of the modular battery 26.

In a preferred embodiment, when a modular battery 26 is installed within the adapter 10 of the present invention, the MCU 66 of the authentication circuit 18 detects the presence of the installed modular battery 26. Detection of the presence of a modular battery 26 may occur by having the authentication circuit 18 within the adapter 10 scan for the presence of a modular battery 26 such as by emitting a ping signal through the communication channels of the adapter 10. Alternatively, the authentication circuit 18 may attempt to call the modular battery 26. For example, the authentication circuit 18 may call the modular battery 26 specification function serial number to obtain an identifier of the modular battery 26 that is stored within the communication circuit 116 or other storage mediums within the modular battery 26.

Additionally or alternatively, the authentication circuit 18 within the adapter 10 may use other techniques to obtain the identifier, such as calling another function that returns an identifier, or reading an identifier from one or more locations in a storage medium of the modular battery 26. The identifier may be generally unique (meaning that it uniquely identifies the modular battery 26 amongst multiple modular batteries, e.g., via a serial number or other suitable identifier). The authentication circuit 18 within the adapter 10 may then compare the identifier to one or more identifiers stored in the memory 68 of the authentication circuit 18, or otherwise analyze the identifier. If the adapter 10 does not recognize the identifier, the process ends and the modular battery 26 is not allowed to power the device 24. If the adapter 10 recognizes the identifier, the authentication circuit 18 allows the modular battery 26 to power the device 24. Additionally or alternatively, the authentication circuit 18 may use other techniques to determine whether it recognizes the installed modular battery 26. For example, the authentication circuit 18 may obtain a name of a manufacturer of the modular battery 26 and analyze the name to determine whether it recognizes the installed battery 26.

In another embodiment, the authentication circuit 18 within the adapter 10 may emit an electrical challenge signal through the battery communication link 80 to the communication circuit 116 residing within the modular battery 26. In a preferred embodiment this signal may comprise an electrical voltage, electrical current or digital data signal. In a preferred embodiment, the authentication circuit 18 within the adapter 10 may send a challenge code to the communication circuit 116 within the modular battery 26.

In a preferred embodiment, upon receiving the challenge signal the modular battery communication circuit 116 analyzes the signal and issues a reply signal that travels back through the fifth wire or communication wire 106 back to the authentication circuit 116 located within the adapter 10. In a preferred embodiment, the response signal may comprise an electrical voltage, an electrical current or digital data signal, such as a response code or identification marker. If the response signal matches an acceptable response, the modular battery 26 is considered to be authentic and voltage or current will be allowed to flow from the modular battery 26 to the host device 24.

In an embodiment, the authentication circuit 18 within the adapter 10 may use authorization techniques based on the SHA-1 algorithm (which is well-known to those of ordinary skill in the relevant art) to authorize the modular battery 26. In such an example, the adapter 10 and the modular battery 26 can both store an authorization key. The authentication circuit 18 can send a challenge to the modular battery 26. The modular battery 26 can then compute a response to the challenge using the authorization key and write it to a storage medium for retrieval by the authentication circuit 18 within the adapter 10. The adapter 10 can read the response from the storage medium of the modular battery 26 and compare it to an anticipated response that the authentication circuit 18 computed using the authorization key and the challenge. If the authentication circuit 18 determines that the two responses match, then the authentication circuit 18 within the adapter 10 authorizes the modular battery 26, and the adapter 10 allows the modular battery 26 to power the device 24. If however, the two responses do not match, then the authentication circuit 18 rejects the installed modular battery 26 and the process concludes. Additionally or alternatively, the authentication circuit 18 may use other techniques to authorize the modular battery 26.

Figure 9:
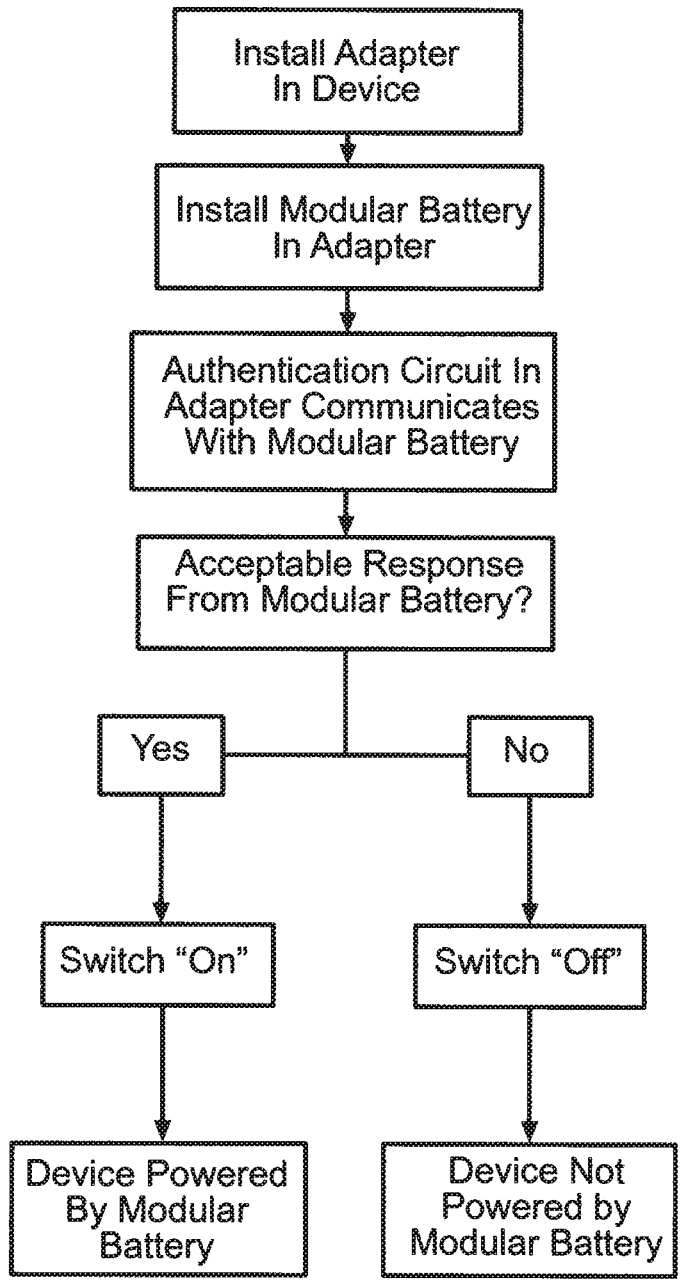
FIG. 9 illustrates a flow chart showing an embodiment of a sequence of events in utilizing the authentication adapter of the present invention.
Figure 11:
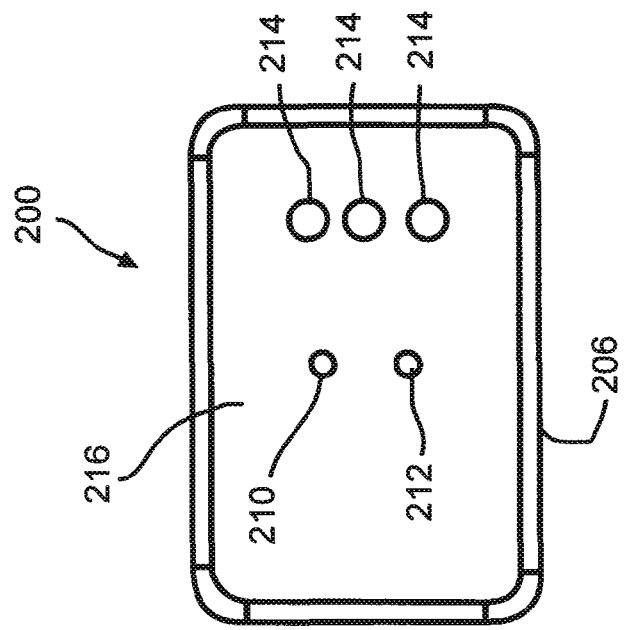
FIG. 11 is a top view of the embodiment of the modular battery shown in FIG. 10.
Figure 10:
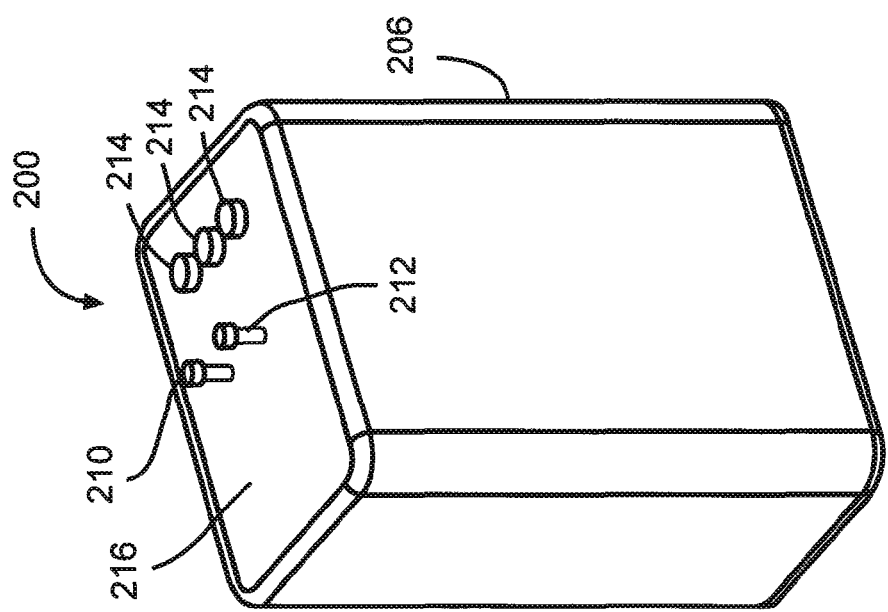
FIG. 10 shows a perspective view of an embodiment of a modular battery comprising a power source authentication circuit of the present invention.

In an embodiment, in the case the authentication circuit 18 accepts the installed modular battery 26 or determines the installed modular battery 26 to be authentic, the MCU 66 of the authentication circuit 18 positions the switch 72 to an "on" position. If, however, the authentication circuit 18 does not accept the installed modular battery 26 or determines the installed modular battery 26 to not be authentic, the MCU 66 of the authentication circuit 18 positions the switch 72 to an "off" position, thereby preventing flow of electrical energy. For example, this may occur if no response is detected within a determined length of time, such as 1-5 seconds, or if an incorrect signal is detected, or if the MCU 66 within the authentication circuit 18 determines the modular battery 26 to not be authentic. Therefore, in this case, electrical energy is prevented from flowing from the modular battery 26 to the host device 24. FIG. 9 illustrates a flow chart presenting an embodiment of a sequence of events when utilizing the modular battery authentication adapter 10 of the present invention.

Figure 12:
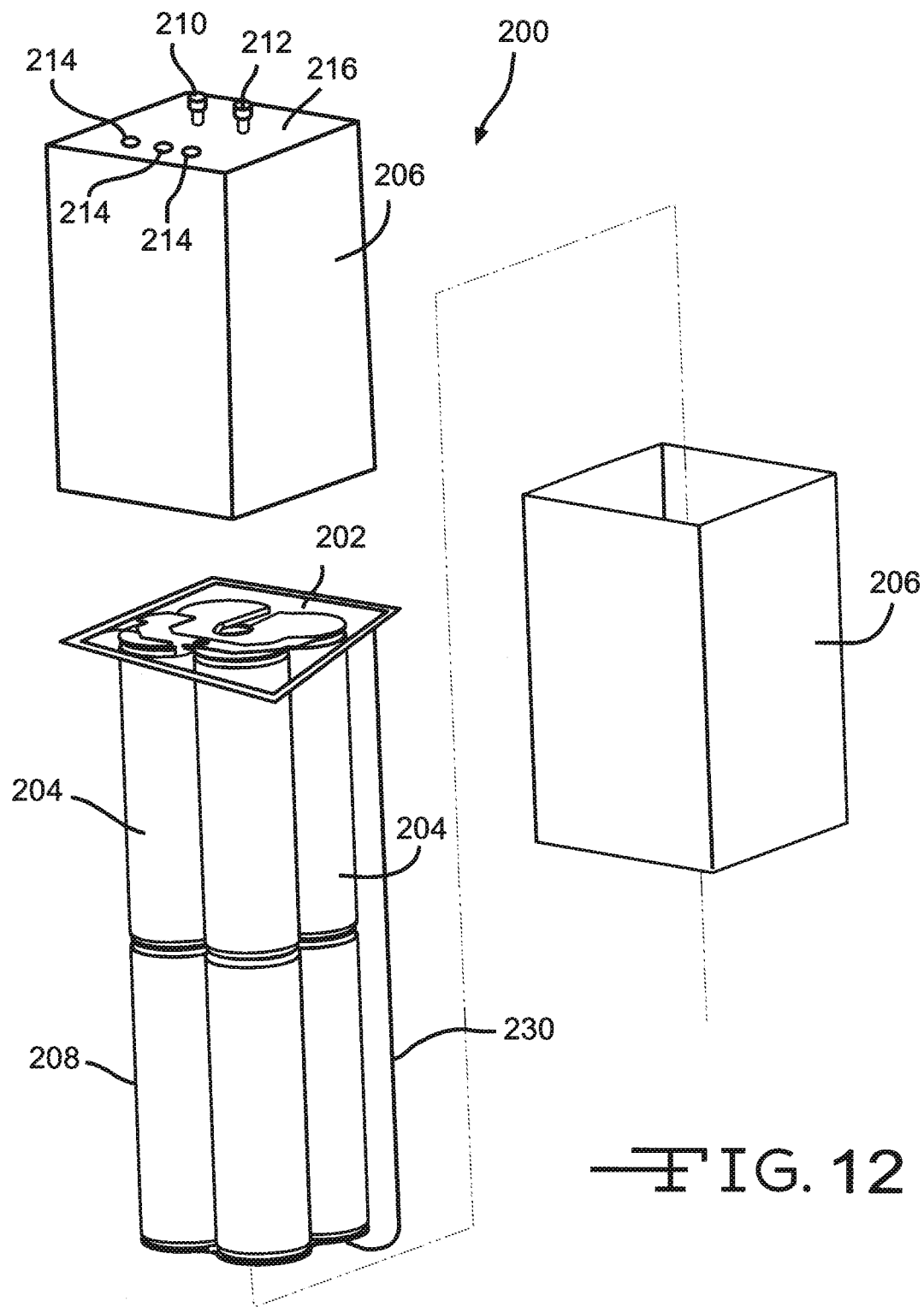
FIG. 12 shows an exploded view of the embodiment of the modular battery shown in FIG. 10.
Figure 13:
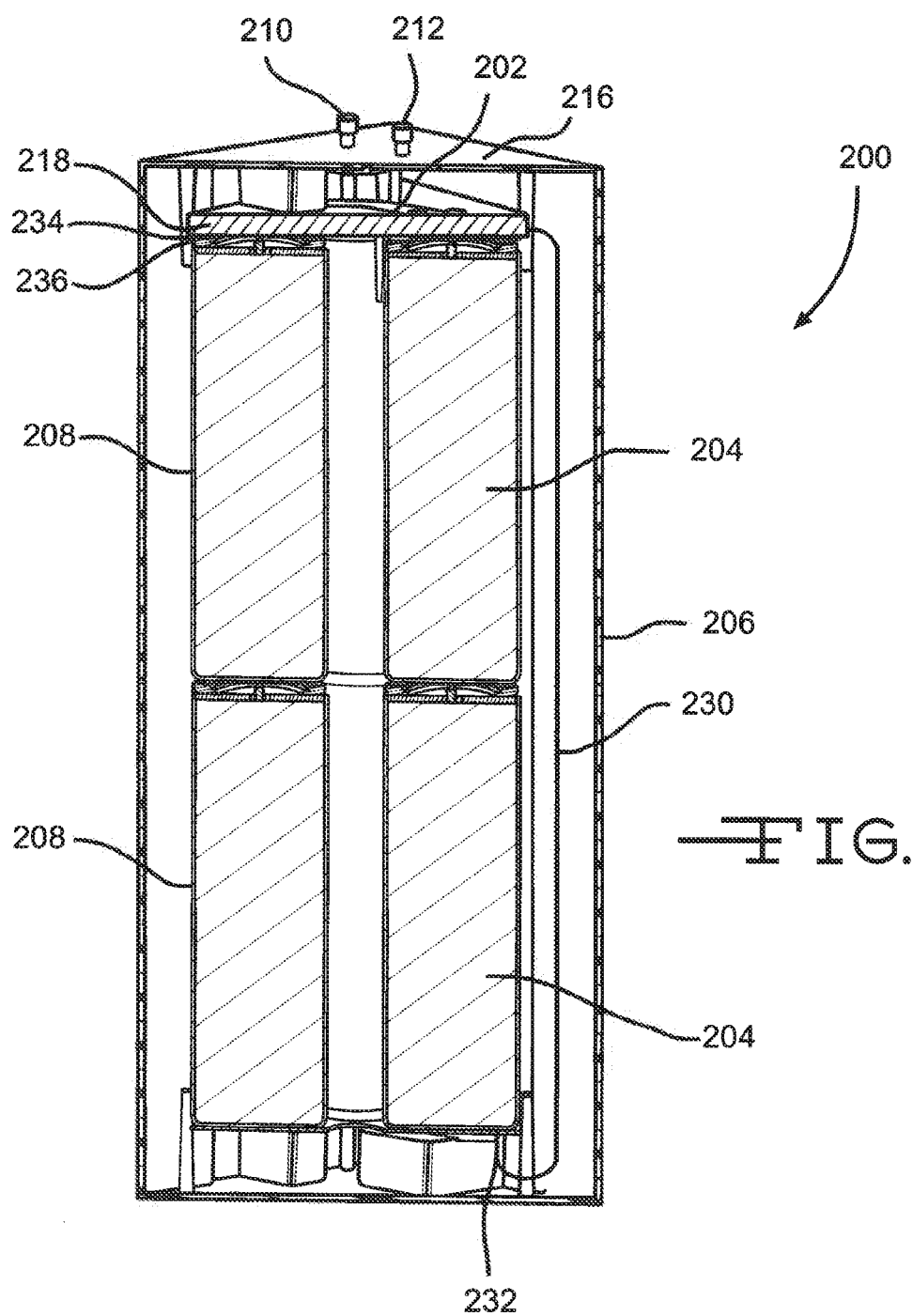
FIG. 13 is a cross-sectional view of the embodiment of the modular battery shown in FIG. 10.

As shown in FIGS. 10-15, in another embodiment, a modular battery 200 is provided according to the present invention. As illustrated, the modular battery 200 comprises a modular battery authentication circuit 202, at least one electrochemical cell 204 and a modular battery housing 206 that encloses the electrochemical cell 204 and authentication circuit 202 therewithin. As shown in FIGS. 12 and 13, the exemplar modular battery 200 comprises six electrochemical cells 204 that are electrically connected to each other. In a preferred embodiment, each of the electrochemical cells 204 comprises a cell casing 208 that encloses an anode and cathode therewithin. In this embodiment, illustrated in FIGS. 10-16, a modular battery authentication circuit 202 is positioned within a modular battery 200. That is in contrast to the embodiment of the authentication adapter 10 previously discussed. As will be discussed in an embodiment, the authentication circuit 202 within the modular battery 200 is designed to communicate directly with a device 209 (FIG. 15) intended to be powered. Similar to the previous adapter 10 embodiment, the embodiment of the modular battery 200 comprising an internal authentication circuit 202 may be used to power a variety of non-limiting devices. Examples of these devices may include portable medical devices, such as external defibrillators, medical drills and saws. In addition, the modular power 200 may be used to power non medical devices like communication devices, such as radios, and analytical equipment such as sensors.

As shown in FIGS. 10-13 and 15, the exemplar modular battery 200 comprises a power pin 210, having opposed proximal and distal power pin ends, a ground pin 212, having opposed proximal and distal ground pin ends, and at least one programming pin 214, having opposed proximal and distal programming pin ends. In a preferred embodiment, the distal ends of the pins 210, 212, 214 protrude through respective openings within a sidewall 216 of the housing 206 of the modular battery 200. The opposing proximal ends of pins 210, 212, and 214 reside within the housing 206 of the modular battery 200.

As shown in FIGS. 12 and 13, the authentication circuit 202 is supported on an authentication circuit board 218. The authentication circuit board 218 is electrically connected to at least one of the cells 204 within the modular battery 200. In addition, the proximal ends of the power pin 210, ground pin 212 and programming pin 214 are electrically connected to the circuit board 218.

Figure 14:
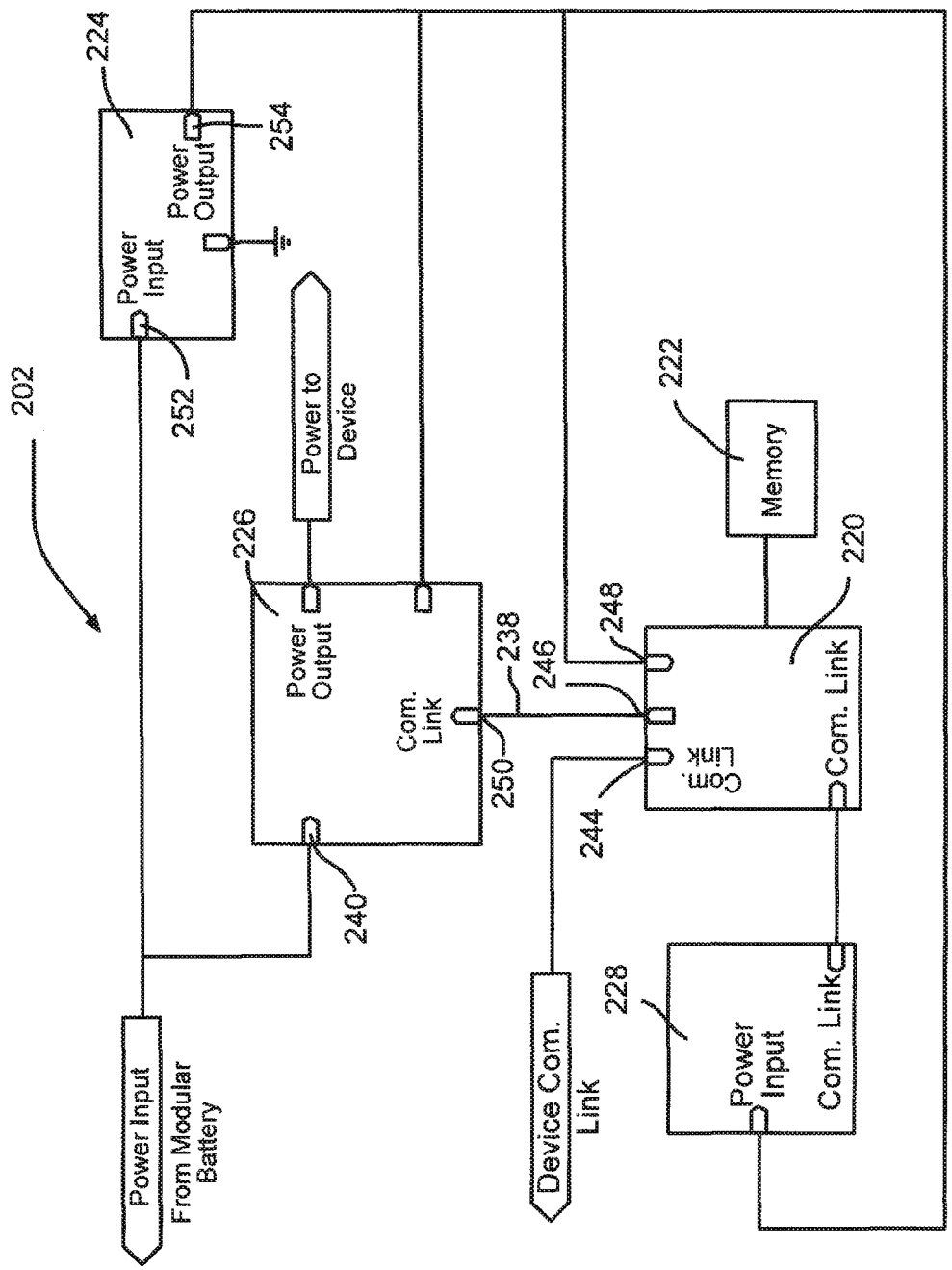
FIG. 14 is an electrical schematic of an embodiment of a power source authentication circuit used in the modular battery of the present invention.

An electrical schematic diagram of an embodiment of the modular battery authentication circuit 202 is provided in FIG. 14. Similarly to the embodiment of the electrical schematic of the adapter authentication circuit 18 provided in FIG. 8, the authentication circuit 202 of the modular battery 200 comprises a micro controller unit (MCU) 220, digital memory 222, a power supply converter 224, and a switch 226 that are electrically connected to each other. A second micro-controller unit 228, as shown in the electrical schematic of FIG. 14, may also be incorporated within the authentication circuit 202, if desired.

Preferably the authentication circuit board 218 is composed of a non-conductive material such as a polymer or ceramic material. Furthermore, in a preferred embodiment, the authentication circuit 202 may be printed on the surface of the substrate such as a printed circuit board (PCB). Additional electronic components (not shown) such as a capacitor, an inductor and/or a resistor may be positioned on the substrate and electrically connected to the battery authentication circuit 202. As shown in FIG. 13, the authentication circuit 202 preferably resides within the housing 206 of the modular battery 200, preferably at the distal end of the modular battery 200.

As shown in FIG. 13, a first wire 230 electrically connects a negative terminal 232 of a cell 204 within the battery 200 to the circuit board 218. In a preferred embodiment, the first wire 230 connects to the negative terminal 232 of the most proximal cell 204 positioned within the battery 200. As shown in FIG. 13, the most proximal cell 204 is the cell 204 that is positioned furthest away from the circuit board 218.

A second wire 234 electrically connects a positive terminal 236 of a cell 204 within the modular battery 200 to the circuit board 218. In a preferred embodiment, the second wire 234 connects to the positive terminal 236 of the most distal cell positioned within the modular battery 200. As illustrated in FIG. 13, the cell 204 that is the most distal is the cell 204 that is positioned closest to the circuit board 218 as depicted in FIG. 13.

In a preferred embodiment, the digital memory 222 preferably comprises non-volatile memory such as read-only memory, flash memory, programmable read-only memory (PROM), erasable programmable read-only memory (EPROM) and electrically erasable programmable read-only memory (EEPROM). Non-volatile memory is herein defined as computer memory that retains stored information when not electrically powered. However, other types of volatile computer memory such as random access memory may be incorporated with the authentication circuit 202. The memory 222 is used to store data and other information such as programming code that is used to instruct and operate the micro-control unit 220.

Figure 15:
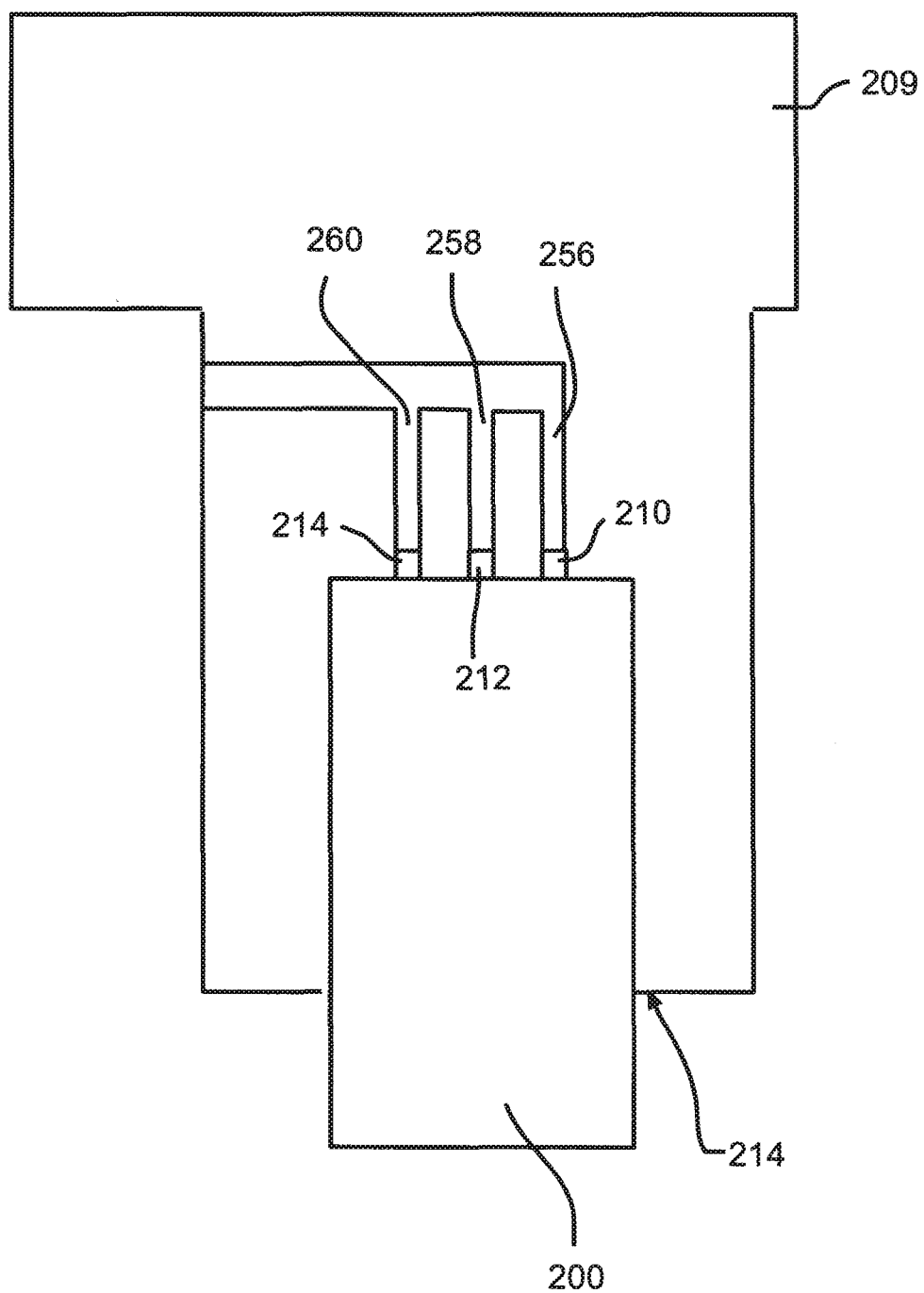
FIG. 15 is a cross-sectional view showing an embodiment of the modular battery of the present invention positioned within a device.

In a preferred embodiment, the switch 226 comprises an electronic control switch such as a transistor or relay switch. Alternatively, the switch may comprise a micro electro-mechanical system (MEMS) switch. A MEMS device is a computer chip in which a circuit controls the operation and movement of a mechanical device such as a sensor, valve, gear, mirror, or actuator that is embedded within the computer chip. The switch 226 controls the flow of electrical voltage or current from the cells 204 of the modular battery 200 to a device 209 intended to be powered (FIG. 15).

As shown in the electrical schematic diagram of FIG. 14, the switch 226 is electrically connected to the micro-control unit (MCU) 220. In a preferred embodiment, the MCU 220 communicates with the switch 226 through a communication link 238 to control the flow of voltage or current from the cells 204 of the modular battery 200 to the device 209. When the switch 226 is positioned in an "on" position, voltage or current is allowed to flow from the cells 204 of the modular battery 200 to the device 209. When the switch is in an "off" position, voltage or current is not allowed to flow from the cells 204 of the modular battery 200 to the device 209. As shown in the electrical schematic diagram given in FIG. 14, electrical voltage or current from the modular battery 200 enters the switch 226 through a power input port 240. Likewise, the voltage or current exits the switch 226, when in the "on" position, through a power output port 242.

In a preferred embodiment, the micro-controller unit (MCU) 220 comprises a digital computer processor. As shown in the electrical schematic diagram of FIG. 14, the MCU further comprises a device communication port 244, a switch communication port 246 and a power input port 248. The switch 226 is electrically connected to the MCU 220 through the switch communication port 250.

The power supply converter 224 modulates electrical power from the cells 204 of the modular battery 200 through the authentication circuit 202. In a preferred embodiment, voltage or current from the cells 204 of the modular battery 200 is received in a power input port 252 of the power supply converter 224. The voltage or current modulated by the power supply converter 224 exits a power output port 254 where it is then distributed to the components of the authentication circuit 202, the switch 226, the MCU 220 and a secondary MCU 228, if desired.

In operation, the modular battery 200 is received within a power input port 211 of a device 209 such as the embodiment shown in FIG. 15. As illustrated in the embodiment, the distal ends of the power pin 210, ground pin 212 and programming pin 214 of the modular battery 200 are positioned within the power input port 211 of a device 209. Specifically, the modular battery 200 should be positioned within the device 209 such that the pins 210, 212 and 214 of the modular battery 200 are contactable to respective terminals 256, 258, and 260 (FIG. 15) that reside within the power input port 211 of the device 209.

In a preferred embodiment, the programming pin 214 of the modular battery 200 is positioned within the device 209 such that it is in electrical communication with the circuitry of the device 209. Specifically, the modular battery programming pin 214 should be positioned such that it is capable of communicating with circuitry of the device 209, in particular the device's circuitry that stores and controls the operation code or firmware of the device 209. Firmware is herein defined as the computer code and related circuitry that controls a device.

In an embodiment, once correctly positioned within the power input port 211 of a device 209, the authentication circuit 202 within the modular battery 200 issues an electrical signal through the programming pin 214. This signal initiates communication between the modular battery 200, specifically between the authentication circuit 202 and the device 209. Preferably, the authentication circuit 202 within the modular battery 200 is capable of reading, analyzing and editing the firmware stored within the host device 209.

In an embodiment, the authentication circuit 202 may interrogate and analyze the version and/or installation date of the firmware of the device 209. If the version of the firmware matches a previously stored set of acceptable version numbers, the authentication circuit 202 enables the switch to be in the "on" position, thus allowing the flow of electrical voltage or current from the cells 204 of the modular battery 200 to power the device 209. If however, the version of the device's firmware does not match an acceptable firmware version stored within the memory 222 of the authentication circuit 202, the switch 226 is positioned in the "off" position, thereby preventing the flow of voltage or current from the modular battery 200 to the device 209.

In a preferred embodiment, the authentication circuit 202 within the modular battery 200 may be able to reprogram the firmware or other code stored within the device 209 such that the device 209 requires a specific input such as an electrical voltage, electrical current, identification code or initiation code to be received from the modular battery 200. In this embodiment, a revised version of the device firmware, stored within the memory 222 of the authentication circuit 202, is uploaded and stored within the electronics of the device 209. In an embodiment, the updated firmware requires that before operation of the device 209, an acceptable signal from the authentication circuit 202 of the modular battery 200 must first be received by the device 209.

In a preferred embodiment, when the modular battery 200 is installed within a device 209, the MCU 220 of the authentication circuit 202 detects the presence of the device 209. Detection of the presence of the device 209 may occur by having the authentication circuit 202 within the modular battery 200 scan for the presence of a device 209 such as by emitting a ping signal through the communication channels of the modular battery 200. Alternatively, the authentication circuit 202 may attempt to call the device 209. For example, the authentication circuit may call the device 209 specification function serial number to obtain an identifier of the device 209 that is stored within the circuitry or other storage mediums within the device 209.

Additionally or alternatively, the authentication circuit 202 within the modular battery 200 may use other techniques to obtain the identifier, such as calling another function that returns an identifier, or reading an identifier from one or more locations in a storage medium of the device 209. The identifier may be generally unique (meaning that it uniquely identifies the device 209 amongst multiple devices, e.g., via a serial number or other suitable identifier).

In an embodiment, once the modular battery 200 has detected the presence of a device 209, the modular battery 200 may then emit a modular battery initiation code to "wake up" the device 209 and alert it to the presence of a modular battery 200. Once the device 209 is awake, the device 209 then emits a device initiation response back to the modular battery 200 to verify that the correct modular battery 200 has been installed. The modular battery 200 then emits a modular battery response signal, such as an identification code or other identifying marker that is received within the device 209. This identification code or marker, such as a serial number or a manufacturer name, is then compared to a list or database of acceptable responses previously stored within the device 209. In a preferred embodiment, the list or database of acceptable modular battery identification codes or markers was previously uploaded and stored within the device 209 by the modular battery 200. If the response from the modular battery 200 matches an acceptable modular battery response, the device will allow itself to be powered by the installed modular battery 200. However, if the modular battery response received by the device 209 does not match an acceptable response, previously stored within the device, the device 209 will not allow itself to be powered by the modular battery 200.

Figure 16:
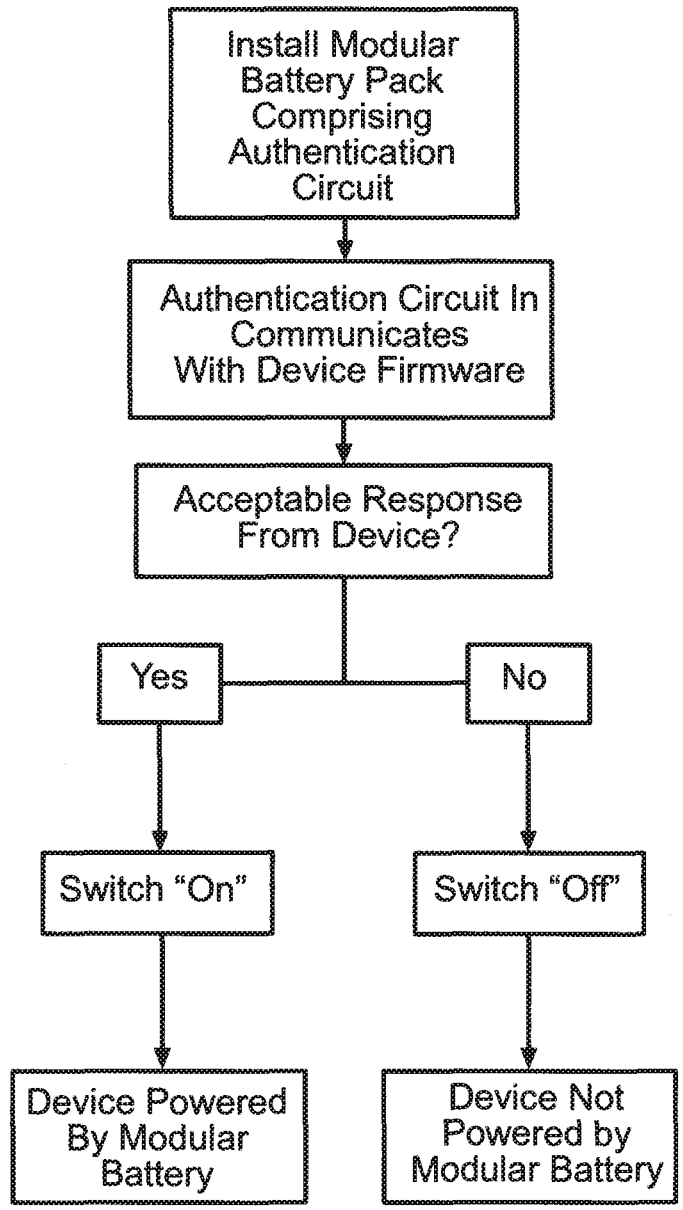
FIG. 16 illustrates a flow chart showing an embodiment of a sequence of events in utilizing the modular battery comprising the power source authentication circuit shown in FIG. 10.

FIG. 16 illustrates a flow chart representing an embodiment of a sequence of events that may occur when utilizing the modular battery 200 comprising the authentication circuit 202 of the present invention. As shown, first the modular battery 200 is installed in a device 209. Next, the authentication circuit 202 within the modular battery 200 communicates with the device's circuitry, particularly the device's firmware. The circuit 202 then analyzes whether the received response was acceptable. If acceptable, the switch 226 within the circuit 202 will be turned on and the device will be powered. If the response is not acceptable, i.e. matches a list of previously stored criteria, the switch 226 will be left in an "off" position thereby preventing the modular battery 200 from powering the device 209.

In an alternate embodiment, the modular battery 200 may be used to authenticate a device 209. In this embodiment the authentication circuit 202 within the modular battery 200 may use authorization techniques based on the SHA-1 algorithm (which is well-known to those of ordinary skill in the relevant art) to authorize the device 209. In such an example, the modular battery 200 and the device 209 can both store an authorization key. The authentication circuit 202 within the modular battery 200 can send a challenge to the device 209. The device 209, through its modified firmware for example, can then compute a response to the challenge using the authorization key and write it to a storage medium for retrieval by the authentication circuit 202 within the modular battery 200. The modular battery 200 can read the response from the storage medium of the device 209 and compare it to an anticipated response that the authentication circuit 202 computed using the authorization key and the challenge. If the authentication circuit 202 determines that the two responses match, then the authentication circuit 202 within the modular battery 200 authorizes the device 209, and the authentication circuit 202 allows the modular battery 200 to power the device 209. If however, the two responses do not match, then the authentication circuit 202 rejects the device 209 and the process concludes. Additionally or alternatively, the authentication circuit 202 may use other techniques to authorize a device 209.

While preferred embodiments of the present invention have been disclosed, it will be appreciated that it is not limited thereto, but may be otherwise embodied with the scope of the following claims.

What is claimed is:

1. A battery adapter, comprising:
  a) an adapter housing comprising an adapter connector body spaced from an adapter receiving port, wherein:
    i) the adapter connector body comprises connector power and ground terminals that are detachably electrically connectable to respective terminals of a host device; and
    ii) the adapter receiving port comprises:
      A) receiving port power and ground terminals that are detachably electrically connectable to respective terminals of a battery, and
      B) at least one first adapter communication terminal that is detachably electrically connectable to a corresponding at least one communication pin of the battery; and
  b) an authentication circuit residing within or on the adapter housing, wherein the authentication circuit is electrically connected to the adapter connector body power and ground terminals and to the adapter receiving port power and ground terminals,
  c) wherein with a battery received in the adapter receiving port and with the connector body connected to a host device, the authentication circuit is programmed to electrically communicate with the battery through the first adapter communication terminal connected to the corresponding battery communication pin to verify authenticity of the battery and, if verified, enable the battery to send electrical power from the receiving port power and ground terminals through the authentication circuit and to the connector power and ground terminals to thereby power the host device.

2. The battery adapter of claim 1 wherein the authentication circuit is programmed to perform at least one function selected from the group consisting of read computer code, analyze computer code, and modify computer code stored within a battery that is received in the adapter receiving port.

3. The battery adapter of claim 1 wherein the authentication circuit is programmed to transmit a challenge signal to the battery and upon receipt of the challenge signal, the battery is configured to issue a response signal to the authentication circuit, and if the battery response signal matches an acceptable response, the authentication circuit is programmed to allow the battery to power the host device.

4. The battery adapter of claim 1 wherein the authentication circuit is programmed to determine, monitor or analyze at least one of an electrical voltage, electrical current, and temperature of a battery that is received in the adapter receiving port.

5. The battery adapter of claim 1 wherein the authentication circuit is programmed to detect the presence of a battery received in the adapter receiving port.

6. The battery adapter of claim 1 wherein with a battery received in the adapter receiving port and wherein, as determined by the authentication circuit, when an authentication criteria is not met, the authorization circuit is programmed to prevent the battery from powering the host device.

7. The battery adapter of claim 6 wherein the authentication criteria is selected from the group consisting of a voltage, a current, a computer code, a serial number, and an identification marker.

8. The battery adapter of claim 1 wherein the adapter receiving port is configured to receive a battery of a chemistry selected from the group consisting of lithium ion (LiON), nickel cadmium (NiCd), nickel metal hydride (NiMH), lithium oxyhalide, thionyl chloride, bromine chloride, and chlorinated sulfuric chloride.

9. The battery adapter of claim 1 wherein the host device is selected from the group consisting of a portable medical device, a sensor, and analytical equipment.

10. The battery adapter of claim 1 wherein the adapter connector body has a polygonal cross-sectional shape that provides a keyed interface with the host device.

11. The battery adapter of claim 1 wherein the respective connector power and ground terminals reside on opposite sides of the adapter connector body.

12. The battery adapter of claim 11 wherein the respective power and ground terminals have a planar surface.

13. The battery adapter of claim 1 wherein the adapter connector body comprises at least one second communication terminal configured to enable communication between a battery positioned within the adapter receiving port and the host device.

14. The battery adapter of claim 1 wherein the authentication circuit comprises:
 a) a micro control unit;
 b) digital memory electrically connected to the micro control unit; and
 c) a switch electrically connected to the micro control unit.

15. The battery adapter of claim 14 wherein the switch is selected from the group consisting of a transistor, a relay switch, and a micro electro-mechanical system (MEMS).

16. The battery adapter of claim 14 wherein the digital memory comprises non-volatile memory selected from the group consisting of read-only memory, flash memory, programmable read-only memory (PROM), erasable programmable read-only memory (EPROM), and electrically erasable programmable read-only memory (EEPROM).

17. A method for authenticating a battery for powering a host device, comprising the steps of:
 a) providing an adapter, comprising:
  i) an adapter housing comprising an adapter connector body spaced from an adapter receiving port, wherein:
   A) the adapter connector body comprises connector power and ground terminals that are detachably electrically connectable to respective terminals of a host device; and
   B) the adapter receiving port comprises receiving port power and ground terminals that are detachably electrically connectable to respective terminals of a battery; and
  ii) providing an authentication circuit residing within or on the adapter housing, wherein the authentication circuit is electrically connected to the adapter connector body power and ground terminals and to the adapter receiving port power and ground terminals;
 b) electrically connecting the adapter connector body to a host device;
 c) positioning a battery within the battery receiving port;
 d) wherein the authentication circuit is programmed to detect that the adapter connector body is electrically connected to the host device and to detect that there is a battery received in the battery receiving port to then emit a challenge signal to the battery and upon receipt of the challenge signal, the battery is configured to issue a response signal to the authentication circuit, and if the battery response signal matches an acceptable response, the authentication circuit allows the battery to power the host device through the authentication circuit.

18. The method of claim 17 including selecting the host device from the group consisting of a portable medical device, a sensor, and analytical equipment.

19. The method of claim 17 including configuring the adapter receiving port to receive a battery of a chemistry selected from the group consisting of lithium ion (LiON), nickel cadmium (NiCd), nickel metal hydride (NiMH), lithium oxyhalide, thionyl chloride, bromine chloride, and chlorinated sulfuric chloride.

20. The method of claim 17 including selecting the response signal from the group consisting of a voltage, a current, a computer code, a serial number, and identification marker.

21. The method of claim 17 including providing the connector body having a polygonal cross-sectional shape that provides a keyed interface with the host device.

22. The method of claim 17 including providing the respective connector power and ground terminals residing on opposite sides of the adapter connector body.

23. The method of claim 22 including providing the respective power and ground terminals having a planar surface.

24. The method of claim 17 including providing the connector body comprising at least one communication terminal configured to enable communication between a battery positioned within the adapter receiving port and the host device.

25. The method of claim 17 including providing the authentication circuit comprising:
 a) a micro control unit;
 b) digital memory electrically connected to the micro control unit; and
 c) a switch electrically connected to the micro control unit.

26. A modular battery, comprising:
 a) at least one electrochemical cell positioned within a housing, wherein the housing is detachably electrically connectable to a host device, and wherein the housing comprises:
  i) cell power and ground terminals that are electrically connected to respective terminals of the at least one cell, and
  ii) at least one communication terminal that is electrically connected to a corresponding communication pin of the cell;
  iii) host power and ground terminals that are electrically connectable to respective terminals of a host device; and
 b) an authentication circuit residing within or on the housing,
 c) wherein when the housing is electrically connected to the host device, but without the electrochemical cell powering the host device, the authentication circuit is programmed to:
  i) electrically communicate with the at least one electrochemical cell through the respective communication terminal and communication pin to verify authenticity of the cell and,
  ii) if verified, the authentication circuit is programmed to allow the cell to send electrical power through the respective cell power and ground terminals to the authentication circuit and then the authentication circuit is programmed to power the host device through the host power and ground terminals.

27. The modular battery of claim 26 wherein the authentication circuit is programmed to perform at least one function selected from the group consisting of read computer code, analyze computer code, and modify computer code stored within the host device.

28. The modular battery of claim 27 wherein the computer code stored within the host device is firmware.

29. The modular battery of claim 27 wherein the at least one electrochemical cell comprises a chemistry selected from the group consisting of lithium ion (LiON), nickel cadmium (NiCd), nickel metal hydride (NiMH), lithium oxyhalide, thionyl chloride, bromine chloride, and chlorinated sulfuric chloride.

30. The modular battery of claim 26 wherein the authentication circuit is programmed to transmit an initiation signal to the host device and then receive a response signal generated by the host device, and wherein:
  a) if the response signal does not correspond to a set of acceptable signals previously stored in digital memory in the authentication circuit, the authentication circuit is programmed to prevent the electrochemical cell from powering the host device, but
  b) if the response signal corresponds to a set of acceptable signals, previously stored in the digital memory in the authentication circuit, the authentication circuit is programmed to allow the electrochemical cell to power the host device.

31. The modular battery of claim 26 being configured to power the host device selected from the group consisting of a portable medical device, a sensor, and analytical equipment.

32. The modular battery of claim 26 wherein the authentication circuit comprises:
  a) a micro control unit;
  b) digital memory electrically connected to the micro control unit; and
  c) a switch electrically connected to the micro control unit.

33. The modular battery of claim 26 wherein when the housing is electrically connected to the host device, but without the electrochemical cell powering the host device:
  i) the authentication circuit is programmed to transmit a challenge to the electrochemical cell, and
  ii) upon receipt of the challenge, the electrochemical cell is programmed to issue a response to the authentication circuit, and
  iii) if the cell response matches an acceptable response, the authentication circuit is programmed to verify the authenticity of the cell and allow the cell to send electrical power through the authentication circuit to the host device.

34. A battery adapter, comprising:
  a) an adapter housing comprising an adapter connector body spaced from an adapter receiving port, wherein:
    i) the adapter connector body comprises connector power and ground terminals that are detachably electrically connectable to respective terminals of a host device; and
    ii) the adapter receiving port comprises receiving port power and ground terminals that are detachably electrically connectable to respective terminals of a battery; and
  b) an authentication circuit residing within or on the adapter housing, wherein the authentication circuit is electrically connected to the adapter connector body power and ground terminals and to the adapter receiving port power and ground terminals,
  c) wherein with a battery received in the adapter receiving port and with the connector body connected to a host device, the authentication circuit is programmed to electrically communicate with the battery through the adapter communication terminal connected to the corresponding battery communication pin to verify authenticity of the battery and, if verified, the authentication circuit is programmed to allow the battery to send electrical power from the receiving port power and ground terminals to the connector power and ground terminals to thereby power the host device.

35. The battery adapter of claim 34 wherein the adapter is programmed to send an adapter challenge to the battery followed by the battery computing a battery response using a battery authentication key stored in a battery storage device followed by the authentication circuit retrieving the battery response.

36. The battery adapter of claim 34 wherein the battery computes the battery response using the battery authentication key stored in the battery storage device and writes the battery response to the battery storage device, and wherein the authentication circuit is programmed to retrieve the battery response from the battery storage device.

37. The battery adapter of claim 36 wherein retrieving the battery response from the battery storage device includes the authentication circuit comparing the battery response to an anticipated battery response computed by the authentication circuit using an authentication circuit authorization key.

38. The battery adapter of claim 37 wherein comparing the battery response to the anticipated battery response includes the step of determining that the responses match, followed by the authentication circuit authorizing the battery to power the host device.

39. A battery adapter, comprising:
  a) an adapter housing comprising an adapter connector body spaced from an adapter receiving port, wherein:
    i) the adapter connector body that is detachably electrically connectable to a host device; and
    ii) the adapter receiving port is detachably electrically connectable to a battery; and
  b) an authentication circuit residing within or on the adapter housing, wherein the authentication circuit is electrically connected to the adapter connector body and to the adapter receiving port,
  c) wherein with a battery received in the adapter receiving port and with the adapter connector body connected to a host device, the authentication circuit is programmed to transmit a challenge to the battery and upon receipt of the challenge, the battery is configured to issue a response to the authentication circuit, and if the battery response matches an acceptable response, the authentication circuit allows the battery to send electrical power from the adapter receiving port through the authentication circuit and to the adapter connector body to thereby power the host device.

* * * * *